(12) United States Patent
Golde et al.

(10) Patent No.: US 6,381,734 B1
(45) Date of Patent: Apr. 30, 2002

(54) METHOD, SOFTWARE AND APPARATUS FOR REFERENCING A METHOD IN OBJECT-BASED PROGRAMMING

(75) Inventors: Peter H. Golde, Bellevue; Anders Hejlsberg, Seattle; Chad W. Royal, Redmond; Tracy C. Sharpe, Seattle; Michael J. Toutonghi, Seattle; Edward H. Wayt, Seattle; Scott M. Wiltamuth, Seattle, all of WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/089,619

(22) Filed: Jun. 3, 1998

(51) Int. Cl.[7] .................................................. G06F 9/45

(52) U.S. Cl. ........................... 717/1; 709/315; 709/313; 717/2

(58) Field of Search ........................... 717/1, 11, 2, 10; 709/313, 315, 332, 310; 707/103

(56) References Cited

U.S. PATENT DOCUMENTS

| | | | | |
|---|---|---|---|---|
| 5,265,206 A | * | 11/1993 | Shackelford et al. | ........ 709/316 |
| 5,341,478 A | * | 8/1994 | Travis, Jr. et al. | ........... 709/203 |
| 5,421,016 A | * | 5/1995 | Conner et al. | ................... 717/7 |
| 5,515,536 A | * | 5/1996 | Corbett et al. | ............... 709/315 |
| 5,619,710 A | * | 4/1997 | Travis, Jr. et al. | ........... 709/203 |

(List continued on next page.)

FOREIGN PATENT DOCUMENTS

| EP | 546684 A2 | * | 6/1993 | ..................... 717/1 |
|---|---|---|---|---|
| EP | 643349 A1 | * | 6/1993 | ..................... 717/1 |

OTHER PUBLICATIONS

Morrisson et al.; Java 1.1 Unleashed. Macmillian Computer Publishing, Chapters 2, 5, 16–18, 39 and 54, May 1997.*

Venners, B.; "Under the Hood: How the Java virtual machine handles method invocation and return", Java World Magazine, accessed online Sep. 24, 1999, Retreived from the Internet: http://javaworld.com/jw-06-1999/jw-06-hood.html, Jun. 1997.*

Weeks, K.; "The Sweet Smell of C++: Rational Enhances Its Rose–ability". Windows Tech Journal, pp 69–72, Sep. 1994.*

Taylor, D.; Object–Oriented Information Systems: Planning and Implementation. John Wiley and Sons, Inc, chapters 3 and 4, Apr. 1992.*

(List continued on next page.)

*Primary Examiner*—Kakali Chaki
*Assistant Examiner*—Kelvin Booker
(74) *Attorney, Agent, or Firm*—Woodcock Washburn LLP

(57) ABSTRACT

Method and apparatus for encapsulating a reference to a method in object-based programming systems and ensuring that the reference is safe are disclosed. The method of encapsulation provides for: a) defining an entity that defines the shape of the method to be referenced; b) obtaining a reference to a method; c) storing this reference in arbitrary data structures; d) passing the reference to code written by other parties; e) enabling invocation of the method by anyone holding the method reference; and f) enabling the holder of a method reference to determine the target object and method being referenced. These objectives are achieved in a strongly typed manner, making it possible for: a) developers to learn of type mismatch problems early (at compile-time) rather than late (at run-time); and b) development tools to present information to developers about the shape of components that use delegates. In addition, a model of event based programming is disclosed, wherein event-related code can be encapsulated in delegates.

38 Claims, 13 Drawing Sheets

38

```
package com.ms.lang;

public abstract class Delegate {
    protected Delegate(Object target, String methodName);
    public static final Delegate combine(Delegate a, Delegate b);
    public static final Delegate combine(Delegate[] delegates);
    public static final Delegate remove(Delegate source, Delegate value);
    public final boolean equals(Object obj);
    public final Object dynamicInvoke(Object[] args);
    public final static Method getMethod();
    public final static Object getTarget();
    public Delegate[] getInvocationList();
}
```

U.S. PATENT DOCUMENTS

| | | | | |
|---|---|---|---|---|
| 5,632,034 A | * | 5/1997 | O'Farrell | 717/1 |
| 5,680,619 A | * | 10/1997 | Gudmundson et al. | 717/1 |
| 5,689,709 A | * | 11/1997 | Corbett et al. | 709/315 |
| 5,732,271 A | * | 3/1998 | Berry et al. | 717/2 |
| 5,768,505 A | * | 6/1998 | Gilchrist et al. | 709/201 |
| 5,864,862 A | * | 1/1999 | Kriens et al. | 707/103 |
| 5,901,314 A | * | 5/1999 | Boehme et al. | 717/1 |
| 5,907,704 A | * | 5/1999 | Gudmundson et al. | 717/1 |
| 5,920,720 A | * | 7/1999 | Toutonghi et al. | 717/5 |
| 5,937,189 A | * | 8/1999 | Banson et al. | 717/1 |
| 5,941,945 A | * | 8/1999 | Aditham et al. | 709/205 |
| 5,991,802 A | * | 11/1999 | Allard et al. | 709/219 |
| 6,002,867 A | * | 12/1999 | Jazdzewski | 717/1 |
| 6,014,710 A | * | 1/2000 | Taluri et al. | 709/237 |
| 6,078,743 A | * | 6/2000 | Apte et al. | 717/1 |
| 6,083,276 A | * | 7/2000 | Davidson et al. | 717/1 |
| 6,104,874 A | * | 8/2000 | Branson et al. | 717/2 |
| 6,182,274 B1 | * | 1/2001 | Lau | 717/2 |
| 6,195,791 B1 | * | 2/2001 | Carlson et al. | 717/1 |
| 6,199,197 B1 | * | 3/2001 | Engstrom et al. | 709/315 |
| 6,275,979 B1 | * | 8/2001 | Graser et al. | 707/103 |
| 6,298,476 B1 | * | 10/2001 | Misheski et al. | 717/2 |

OTHER PUBLICATIONS

Morgan et al.; "Visual J++ Unleashed". Sams.net Publishing, Chapter 3, Dec. 1996.*

Norton et al.; Peter Norton's Guide to Java Programming. Sams.net Publishing, Chapter 1, Sep. 1996.*

Singhai, A.; "Quarterware for Middleware". IEEE/IEE Electronic Library[online], Proceedings of the 18th International Conference on Distributed Computing Systems, pp. 192–201, May 1998.*

Jia et al.; "Object–Oriented Groups for Distributed Computation Development", IEEE/IEE Electronic Library[online], IEEE International Conference on Systems, Man and Cybernetics, vol. 3, pp. 1664–1669, Dec. 1996.*

Swan, Tom Swan's Mastering Java with Visual J++. Macmillan Computer Publishing, Chapter 19, pp. 531–533, Jun. 1997.*

Raiha, L.; "Delegation: Dynamic Specialization". ACM Digital Library[online], Proceedings of the 1994 Conference on TRI–ADA, pp 172–179, Nov. 1994.*

Stein, L.A.; "Delegation is Inheritance". ACM Digital Library[online], Proceedings on Object–Oriented Programming Systems, Languages and Applications, pp 138–146, Oct. 1987.*

Minsky et al.; "Controllable Delegation: An Exercise in Law–Governed Systems". ACM Digital Library[online], Proceedings on Object–Oriented Programming Systems, Languages and Applications, pp 371–380, Oct. 1989.*

Taivalsaari, A.; "On the Notion of Inheritance". ACM Digital Library[online], ACM Computing Surveys, vol. 28, Iss 3, pp 438–479, Sep. 1996.*

Borning, A.H.; "Classes Versus Prototypes in Object–Oriented Languages". ACM Digital Library[online], Proceedings of the 1986 Fall Joint Computer Conference, pp 36–40, Aug. 1986.*

Lieberman, H.; "Using Prototypical Objects to Implement Shared Behavior in Object Oriented Systems". ACM Digital Library[online], Proceedings on Object–Oriented Programming Systems, Languages and Applications, pp 214–223, Sep. 1986.*

Almarode, J.; "Rule–Based Delegation for Prototypes". ACM Digital Library[online], Proceedings on Object–Oriented Programming Systems, Languages and Applications, pp 363–370, Oct. 1989.*

Rumbaugh et al.; Object–Oriented Modeling and Design. Prentice–Hall, Inc., Englewood Cliffs, NJ, Chapters 4, 10 and 14, Jan. 1991.*

Aitken, P.G., "Basically Visual", *Visual Developer*, pp. 1–8, (1997).

Horstmann, C.S., et al., *Core Java, vol. 1—Fundamentals*, ISBN 0–13–081933–6, pp. 206–224, (1999).

Kernighan, B.W., et al., *In: The C Programming Language, Second Edition*, ISBN 0–13–110370–9, pp. 118–121, (1988).

Petzold, C., *In: Programming Windows 95, The Definitive Developer's Guide to the Windows 95 API*, pp. 13–47, 336–339, (1996).

Stroustrup, B., *In: The C++ Programming Language, Third Edition*, ISBN 0–201–88954–4, pp. 156–160, (1997).

Thurrott, P., et al., *Delphi 3 Superbible*, ISBN 1–57169–027–1, Table of Contents, (1997).

Adler, R.M., "Emerging Standards for Component Software", *IEEE Computer*, 68–77, (1995).

* cited by examiner import java.util.*;

// Defining the delegate
delegate void SimpleDelegate();

```
public class MyClass
{
    public void hello()
    {
        System.out.println("Hello, world");
    }

// Using the SimpleDelegate class.
    public static void main(String[] args)
    {
        MyClass o = new MyClass();
        SimpleDelegate f;

f = new SimpleDelegate(o.hello);
        f.invoke();
    }
}
``` delegate void EmptyMethod();

34 package vista;

delegate void EmptyMethod();

FIG. 5A

36 delegate void (Foo(int x);   // declare delegate type class Control Manager {

Foo f;                          // declare delegate instance

Control c;                      // An object that has the method we
                                              we want to wire up

{

String methodName;

methodName = <some expression>; // Which method are we using?

f = new Foo(c, methodName); // Create a delegate to that method.

38 package com.ms.lang;

public abstract class Delegate { protected Delegate(Object target, String methodName);

public static final Delegate combine(Delegate a, Delegate b);

public static final Delegate combine(Delegate[] delegates);

public static final Delegate remove(Delegate source, Delegate value);

public final boolean equals(Object obj);

public final Object dynamicInvoke(Object[] args);

public final static Method getMethod();

public final static Object getTarget();

public Delegate[] getInvocationList();

40 public abstract class MulticastDelegate extends Delegate {

MulticastDelegate next;

protected MulticastDelegate(Object target, String methodName);

```
package com.ms.lang;
    public Callable
    {
        public Object invoke(Object args[]);
    }
```

```
package cor.event;
    class MouseEvent extends Event
    {
      public int button;
      public int clicks;
      public int x;
      public int y;

public MouseEvent(int button, int clicks, int x, int y)
        {
          this.button = button;
          this.clicks = clicks;
          this.x = x;
          this.y = y;
        }
    }
```

```
protected void onMouseMove(MouseEvent e)
{
        if (mouseMoveHandler != null)
                mouseMoveHandler.invoke(this, new MouseEvent(x, y));
}
```

```
void boxA_mouseMove(Object source, MouseEvent e)
{
        display("Mouse in Box A at " + stringFromCoord(e.x, e.y));
}
```

```
Box boxA = new Box();
boxA.addOnMouseMove(new MouseEventHandler(boxA_mouseMove));
```

FIG. 12

// Connecting

Box boxA = new Box();

boxA.addOnMouseMove(new MouseEventHandler(boxA_mouseMove));

// Disconnecting boxA.removeOnMouseMove(new MouseEventHandler(boxA_mouseMove));

54

```
public class MouseEvent extends Event
{
        public int x;
        public int y;

public MouseEvent(int x, int y)
        {
                this.x = x;
                this.y = y;
        }
}
public multicast delegate void MouseEventHandler(Object source,
MouseEvent e);

import com.ms.lang.*;

public class Box
{
        MouseEventHandler mouseMoveHandler = null;
        protected void onMouseMove(MouseEvent e)
        {
                if (mouseMoveHandler != null)
                        mouseMoveHandler.invoke(this, e);
        }
        public void addOnMouseMove(MouseEventHandler
        handler)
        {
                mouseMoveHandler = (MouseEventHandler)
                Delegate.combine(mouseMoveHandler, handler);
        }
        public void removeOnMouseMove(MouseEventHandler
        handler)
        {
                mouseMoveHandler = (MouseEventHandler)
                Delegate.remove(mouseMoveHandler, handler);
        }
        void test()
        {
                onMouseMove(new MouseEvent(10, 10));
        }
}
```

```
public class BoxUser
{
        Box boxA = new Box();

void boxA mouseMove(Object source, MouseEvent e)
        {
                System.out.println("The mouse moved in Box A at: " + e.x + ", " +
                e.y);
        } void connect()
        {
                boxA.addOnMouseMove(new MouseEventHandler(boxA
                mouseMove));
        } void disconnect()
        {
                boxA.removeOnMouseMove(new MouseEventHandler(boxA
                mouseMove));
        } void test()
        {
                connect();
                boxA.test();
                disconnect();
        }
}
```

```
import wfc.ui.*;
import com.ms.lang.*;

public class Smiley extends Control
{
        private boolean happy = true;

private EventHandler happyChangedHandler = null;
        private EventHandler happyChangingHandler = null;

public void addOnHappyChanged(EventHandler handler)
        {
                happyChangedHandler = (EventHandler)
                        Delegate.combine(happyChangedHandler, handler);
        } public void addOnHappyChanging(CancelEventHandler handler)
        {
                happyChangingHandler = (EventHandler)
                        Delegate.combine(happyChangingHandler, handler);
        } public boolean getHappy()
        {
                return happy;
        } protected void onHappyChanged(Event e)
        {
                if (happyChangedHandler != null)
                        happyChangedHandler.invoke(this, e);
        } protected void onHappyChanging(CancelEvent e)
        {
                if (happyChangingHandler != null)
                        happyChangingHandler.invoke(this, e);
        }
```

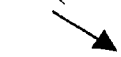

```
public void removeOnHappyChanged(EventHandler handler)
{
        happyChangedHandler = (EventHandler)
        Delegate.remove(happyChangedHandler, handler);
} public void removeOnHappyChanging(CancelEventHandler handler)
{
        happyChangingHandler = (EventHandler)
        Delegate.remove(happyChangingHandler, handler);
} public void setHappy(boolean value)
{
        if (value != happy)
        {
                CancelEvent ce = new CancelEvent(false);

onHappyChanging(ce);
                if (!ce.cancel)
                {
                        happy = value;
                        onHappyChanged(Event.EMPTY);
                }
        }
    }
}
```

```
void setOnFoo(MouseEventHandler value)
    {
        // Remember value
    }

MouseEventHandler getOnFoo()

{
        // Return the last value set, or null if no value has been set
    }
```

```
package wfc.core;
    public class Event
    {
        public static final Event EMPTY = new Event();
        public Event();
    }
```

```
package wfc.core;
public multicast delegate void EventHandler(Object source, Event e);
```

FIG. 18

```
package wfc.core;
public class CancelEvent extends Event
{
    public boolean cancel;
    public CancelEvent(boolean cancel);
}
```

```
package wfc.core;
public multicast delegate void EventHandler(Object sender, Event e);
```

METHOD, SOFTWARE AND APPARATUS FOR REFERENCING A METHOD IN OBJECT-BASED PROGRAMMING

COPYRIGHT NOTICE/PERMISSION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to the software and data as described below and in the drawing hereto: Copyright© 1998, Microsoft Corporation, All Rights Reserved.

TECHNICAL FIELD OF THE INVENTION

This invention relates generally to computer languages, and more particularly to method and apparatus for programming in object-based or object-oriented languages.

BACKGROUND OF THE INVENTION

High-level programming languages enable developers to decompose code into smaller chunks. In non-object-oriented languages the smallest unit of decomposition is a procedure or function. In object-oriented languages, the smallest unit of decomposition is typically a method on a class.

Many modern programming languages also have mechanisms that enable developers to treat these decomposition units as values that can be used as values (passed around, stored in data structures, etc.) and also be used to "call" or "invoke" the code chunk that the value represents. Different languages provide different mechanisms.

In non-object-oriented programming languages, the best known of these constructs is the function pointer found in C and C++. In functional programming languages (LISP, ML, Scheme, etc.) this style of programming is common. In object-oriented programming languages, no adequate mechanism for this purpose has been developed.

In order for a programming system (language and runtime) to enable developers to create and use method references, the present invention addresses the following design objectives:

a) defining an entity that defines the shape of the method to be referenced;
b) obtaining a reference to a method;
c) storing this reference in arbitrary data structures;
d) passing the reference to code written by other parties;
e) enabling invocation of the method by anyone holding the method reference; and
f) enabling the holder of a method reference to determine the target object and method being referenced.

Furthermore, the programming system of the present invention accomplishes the above objectives in a strongly typed manner, making it possible for:

a) developers to learn of type mismatch problems early (at compile-time) rather than late (at run-time); and
b) development tools to present information to developers about the shape of components that use delegates.

Prior Solutions to Related Problems

A number of products employ C and C++ like function pointers, such as Microsoft® Visual C++, Visual Basic and Visual Basic A, all available from Microsoft Corporation. The Windows® API makes extensive use of function pointers as well. Function pointers of this kind are deficient for a number of reasons:

a) they are not type-safe and result in casting;
b) they are not security-aware—a function pointer is just a pointer that can be inadvertently altered and then invoked, resulting in a system crash; and
c) they don't allow for accessing the target object and method.

The Microsoft® Java VM and related products have a "Java Core Reflection" system that provides a primitive form of method reference. A developer can obtain a java-.lang.reflect.Method instance. This instance can be used to invoke methods in a late-bound manner. This form of reference is inherently late-bound and therefore inefficient.

SUMMARY OF THE INVENTION

According to one example embodiment of the invention, there is provided a method for programming a computer in object-based computer code, comprising using a computer to perform the steps of invoking a first method by calling a second method of an instance of a class wherein the parameters supplied to the second method are supplied to the first method, and the parameter list of the second method matches the parameter list of the first method, and further wherein the first method is identified by name and by matching the parameter list and result type of the first method with the parameter list and result type declared for the class.

According to another feature, the instance of the class is represented by a value that can be assigned to variables and passed from one procedure to another, and program code is used to invoke the second method on a variable that has been assigned a value representing an instance of the class.

In another embodiment, security permissions are associated with each class in an object-based program, and these permissions are used to determine if a call by the first method to the second method is permitted.

In still another embodiment, the first method is created automatically upon declaration of the first class.

In yet another embodiment, the first method is used to handle events of the object-based program.

In still another embodiment, one or more additional first methods are invoked with the call to the second method, wherein one or more corresponding additional sets of parameters are supplied to the second method to be supplied to the one more additional first methods, respectively. Furthermore, an invocation list is associated with the second method, wherein the invocation list specifies the first methods to be invoked. In addition, first methods may be added to and deleted from the invocation list.

In yet other embodiments, the method outlined above is incorporated into a computer program, a compiler, an interpreter and in a programming system including hardware and software.

BRIEF DESCRIPTION OF THE DRAWING

FIGS. 4 and 5A illustrate example declarations of an early-bound delegate according to the present invention.

FIG. 5B illustrates an example of constructing a late-bound Delegate based on a string method name.

FIG. 6 is an example definition of the class Delegate according to the present invention.

FIG. 7 is an example definition of the class Multicast-Delegate.

FIG. 8 illustrates an example embodiment which extends Microsoft® Visual J++ to include a com.ms.lang.Callable interface.

FIG. 9 illustrates an example event class according to the present invention.

FIG. 10 illustrates example event-handling code according to the present invention.

FIG. 11 illustrates example event-handling code according to the present invention.

FIG. 12 illustrates example event-handling code according to the present invention.

FIGS. 14A–14B illustrate an example event-handling program using delegates according to the present invention.

FIGS. 15A–15B illustrate an example event-handling program according to the present invention.

FIG. 16 illustrates an example of a single-cast event-handling program according to the present invention.

FIG. 17 illustrates a definition of the class Event according to the present invention.

FIG. 18 illustrates an example definition of an event-handler declaration according to the present invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

INTRODUCTION

The present invention provides a mechanism, termed a "delegate" herein, for referencing a method in object-based programming. While a function pointer contains a reference to a function, a delegate contains a reference to a method. The two differ in that a function pointer contains just one reference (a function), whereas a delegate contains a reference to an object and a method of that object.

A useful property of a delegate as described herein is that the delegate doesn't know or care about the type (class) of the object that it references. Rather, all that matters is that the parameter list of the referenced method is compatible with the delegate. This makes delegates quite useful for "anonymous" notification usage—a caller invoking a delegate does not need to know exactly what class or member is being invoked.

Similarly to a function pointer, a delegate is a value. Like other values, it can be assigned to variables, passed from one procedure to another, etc. A delegate can also be used/applied/called. Zero or more arguments may be passed to the delegate when performing this operation.

Delegates differ from function pointers in that delegates can be safe, or strongly typed. Furthermore, while function pointers are context free—when a function is invoked through a function pointer, the function has no context other than that passed through parameters—a delegate carries its context along with it. When a method is invoked through a delegate, the invocation takes place on the object referenced by the delegate and thus provides the method with a known context.

Figure 1:
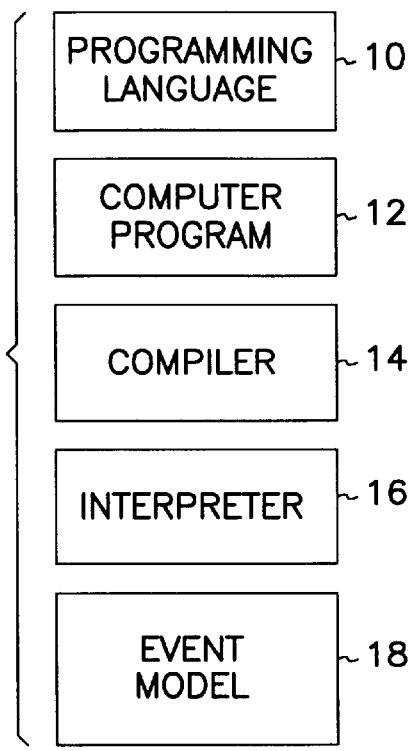
FIG. 1 illustrates a block diagram of the major components of the present invention.
Figure 2:
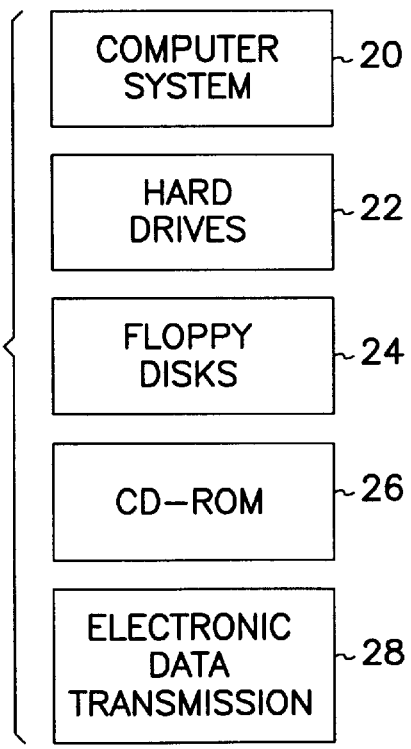
FIG. 2 illustrates the platforms and carriers applicable to the present invention.

As will be described more fully below, the invention takes a number of different forms, as illustrated in FIG. 1. As shown therein, the example embodiment of delegates described herein is embodied in the form of a programming language 10, a computer program 12, a compiler 14, Java Virtual Machine interpreter software 16, and an event model 18. As illustrated in FIG. 2, the these various embodiments can be executed on a computing system 20 (including conventional computing components such as but not limited to a CPU, storage, memory, keyboard, mouse) for example but not by way of limitation an IBM-compatible personal computer, and stored or otherwise embodied in machine readable form on various carrier media such as hard drives 22, floppy disks 24, CD-ROM 26 or as an electronic data transmission 28.

EXAMPLE EMBODIMENT OF THE INVENTION IN J++

The following example embodiment of the invention describes an implementation of delegates in Microsoft Corporation's Microsoft® Visual J++, version 6.0. However, the present invention is in no way limited to the J++ language, but rather is broadly applicable to any object-oriented programming system such as C++ or an object-based programming system such as Microsoft® Visual Basic. As used herein, the term "object-oriented" means a programming language which is both object-based and supporting inheritance. The term "object-based" means a programming language in which code is organized into objects but which does not necessarily support inheritance, such as Microsoft® Visual Basic.

Figure 3:
FIG. 3 is an example J++ computer program according to the present invention.

Prior to describing the invention in detail, a simple example of a J++ computer program 30 using delegates is presented in FIG. 3, wherein a delegate instance encapsulates a method on the instance. In this case, the method "hello" is called using a delegate "f". Moreover, the declaration of the delegate defines the kinds of methods that the delegate is capable of encapsulating.

The example program of FIG. 3 illustrates how an instance f of delegate SimpleDelegate is instantiated ("f= new SimpleDelegate(o.hello)"), and subsequently invoked ("f.invoke( )"). As described more fully below, in order to be valid and executable, the type of the SimpleDelegate delegate must match the type of the "hello" method referenced. In this case, both hello and SimpleDelegate require no input parameters and have a void output. As also explained further below, this requirement makes delegates type-safe.

Set forth below is a description of delegates, as an extension of the J++ language, as implemented in Microsoft® Visual J++, Version 6.0. The Java Language Specification, as published by Sun Microsystems, Inc., is hereby incorporated herein by reference. The Java Language Specification is alternatively referred to herein as "JLS", and furthermore is quoted herein in part.

Delegate Declarations in Example J++ Embodiment

A delegate declaration according to the example embodiment of the invention set forth herein specifies a new class that derives from either Delegate or MulticastDelegate. The DelegateDeclaration takes the form:

DelegateModifiers$_{opt}$ delegate ResultType Identifier (FormalParameterList$_{opt}$) Throws$_{opt}$ The relevant productions for class declaration are:

ClassModifiers$_{opt}$ class Identifier Super$_{opt}$ Interfaces$_{opt}$ ClassBody A DelegateDeclaration results in a class that, if declared using the Java language syntax of the present example, has the following attributes:

1) For ClassModifiers$_{opt}$, the class declaration has DelegateModifiers$_{opt}$, plus the following additional modifiers, assuming they may be specified in the given context: static, final.
2) For Identifier, it has the Identifier of the DelegateDeclaration.
3) For Super$_{opt}$, it has "extends com.ms.lang.MulticastDelegate" if the multicast modifier is specified and "extends com.ms.lang.Delegate" if the multicast modifier is omitted.
4) For Interfaces$_{opt}$, it has " ".

Figure 4:

It follows that if a delegate is declared in a named package (see § 7.4.1 of JLS) with fully qualified name P (see § 6.7 of JLS), then the delegate has the fully qualified name P.Identifier. If the delegate is in an unnamed package (see § 7.4.2 of JLS), then the delegate has the fully qualified name Identifier. In the example of FIG. 4, the delegate EmptyMethod (32) is declared in a compilation unit with no package statement, and thus EmptyMethod is its fully qualified name, whereas in the example code 34 of FIG. 5A the fully qualified name of the delegate EmptyMethod is vista.EmptyMethod.

In the present example embodiment of the invention, the compiler 14 (executable on a digital computing platform) generates a compile-time error:

1) if the Identifier naming a delegate appears as the name of any other delegate type, class type or interface type declared in the same package (See §7.6 of JLS); or
2) if the Identifier naming a delegate is also declared as a type by a single-type-import declaration (See §7.5.1 of the JLS) in the compilation unit (See §7.3 of the JLS) containing the delegate declaration.

Scope of a Delegate Type Name

The Identifier in a delegate declaration specifies the name of the delegate. This delegate name has as its scope (See §6.3 of the JLS) the entire package in which the delegate is declared.

Delegate Modifiers

A delegate declaration may include delegate modifiers. DelegateModifiers can be zero or one of the following:

public private static final multicast.

If two or more delegate modifiers appear in a delegate declaration, then it is customary, though not required, that they appear in the order consistent with that shown above in the production for DelegateModifier.

A delegate declaration that includes the multicast modifier must have a ResultType of void; otherwise, a compilation error occurs.

The access modifier public is discussed in §6.6 of the JLS. The compiler of this example embodiment of the invention produces a compile-time error if:

1) more than one delegate modifier is used;
2) if the same modifier appears more than once in a delegate declaration, or if a delegate declaration has more than one of the access modifiers public and private; or
3) if the private modifier appears in a delegate declaration that is not nested within a class.

Delegates are implicitly static. It is permitted, but strongly discouraged as a matter of style, to redundantly specify the modifier static within a delegate declaration. Moreover, Delegates are implicitly final. It is permitted, but strongly discouraged as a matter of style, to redundantly specify the modifier final within a delegate declaration.

According to the present example embodiment, delegate definitions may appear wherever class definitions appear. Like a class definition, a delegate definition may be nested within a class definition. In addition, Delegates are always top-level.

The members of a delegate include members inherited from the base class (either Delegate or MulticastDelegate class), plus a special, automatically created invoke method (described below) that can be used to invoke the encapsulated method. A delegate declaration also results in a class with a special, automatically generated constructor.

The Invoke Method

The members of a delegate include an automatically created invoke method that can be used to invoke the encapsulated method. The signature and return type of the invoke method are determined by the delegate declaration. Specifically, the signature of the invoke method is:

ResultType invoke(FormalParameterList$_{opt}$) Throws$_{opt}$ where ResultType, FormalParameterList (if any) and Throws (if any) are those of the delegate declaration.

Delegate Instantiation

Delegates have two constructors, as follows:

1) An "instance" constructor whose shape is defined by the Delegate base class. The arguments to this constructor, an Object and a String method name, combined with the type of the delegate, uniquely specifies a member on the indicated object that matches the delegate definition. The newly constructed delegate encapsulates this method.
2) A special "method designator" constructor that enables most of the method resolution to be done at compilation time rather than during execution. The method designator delegate is not exposed through Java Core Reflection.

The class and instance constructors are not special in any way; they are discussed in detail in the specification of the base Delegate class set forth herein. A method designator expression is used to indicate a class or instance method for the purpose of delegate instantiation.

The ClassInstanceCreationExpression takes the form:
   new ClassType (ArgumentList$_{opt}$)
   DelegateInstantiationExpression The DelegateInstantiationExpression takes the form:
   new DelegateType (MethodDesignator)

The MethodDesignator takes the form:
   MethodName
   Primary.Identifier
   super.Identifier The DelegateType is
   a class deriving from com.ms.lang.Delegate A method designator is not enough to designate a method. To designate a specific method, rather than (potentially) a set of methods, it is necessary to refer to the return type and signature (number and types of arguments) of the delegate being instantiated with the method designator. For this reason, the MethodDesignator and the new instance specification form are described as a single unit.

Delegate instantiation employs lookup rules that are similar to those for method invocation expressions (See §15.11 of JLS). Designating a method is complex because of the possibility of method overloading and instance method overriding. Determining the method that will be invoked by a method invocation expression involves several additional steps. Described below are the steps involved in delegate instantiation, both at compile-time and at run-time, according to the present example embodiment of the invention(s).

Early-Bound and Late-Bound Delegates

In the example of FIG. 3, the instantiation "f=new SimpleDelegate(o.hello)" is an early-bound delegate, in which the method "hello" is known at compile time. In some cases, the method the delegate should be bound to is not known when the program is compiled. For example, the user of an interactive development environment might specify the name of a method for program prototyping, or the name of the method to be called might be computed or entered in some other fashion. In this case, an instance of a delegate can be constructed by using a two-argument constructor.

The first argument of the constructor specifies the object that the method should be called on. The second argument of the constructor specifies the name of the method. The object specified in the first argument is checked to make sure that it has a method of the indicated name, with the same signature (i.e., return type and argument types) as the delegate class was declared with. If it does not, an exception occurs; if it does, a new delegate object is constructed and returned.

The instantiation of a such a "late bound" delegate, as described immediately above, takes the form, for example, of "g=new SimpleDelegate(o, "hello")," wherein the method "hello" is a string that may be defined during execution of the program. In the case of the late bound delegate, invocation takes the form of "g.dynamicInvoke (Object[ ]args)". By way of illustration, the example program 36 of FIG. 5B constructs a late-bound delegate based on a string method name.

Compiler Operation

As noted above, the example embodiment of the present invention includes a compiler 14. Several steps are required to process a delegate instantiation expression at compile-time. First, the compiler must determine what class or interface to search. Second, the compiler must search for a method that is matching and accessible. Third, the compiler must check that the method is appropriate. These processes are described in more detail below.

Compile-Time Step 1: Determine Class or Interface to Search:

The first step in processing a delegate instantiation expression at compile time is to figure out the name of the method and which class or interface to check for definitions of methods of that name. There are several cases to consider, depending on the form of the method designator, as follows:

1) If the form is MethodName, then there are two sub-cases:
   a) If it is a simple name, that is, just an Identifier, then the name of the method is the Identifier and the class or interface to search is the one whose declaration contains the method designator.
   b) In all other cases, the qualified name has the form FieldName.Identifier; then the name of the method is the Identifier and the class or interface to search is the declared type of the field named by the FieldName.

2) If the form is Primary.Identifier, then the name of the method is the Identifier and the class or interface to be searched is the type of the Primary expression.

3) If the form is super.Identifier, then the name of the method is the Identifier and the class to be searched is the superclass of the class whose declaration contains the delegate instantiation. A compile-time error occurs if such a method designator occurs in an interface, or in the class Object, or in a static method, a static initializer, or the initializer for a static variable. It follows that a method designator of this form may appear only in a class other than object, and only in the body of an instance method, the body of a constructor, or an initializer for an instance variable.

Compile-Time Step 2: Determine Method Signature:

The second step searches the class or interface determined in the previous step for method declarations. This step uses the name of the indicated method and the types of the delegate definition's formal parameters to locate method declarations that are both matching and accessible, that is, declarations that match the type of the delegate being instantiated, and can be correctly invoked from the delegate instantiation context. Because the matching rules are strict, there can only be one such method declaration.

A method either matches a delegate type, or not. It is possible to instantiate a delegate instance of type T that encapsulates method M if and only if M matches T.

Let M be the method and Tbe the type of the delegate. M matches T if and only if all of the following are true:

1) M and T have the same number of formal parameters;
2) The type of each of M's parameters identically matches the type of T's parameters;
3) The result type of M identically matches the result type of T; and
4) M is not declared to throw more checked exceptions than T. If M has a throws clause that mentions any checked exception types, then T must have a throws clause, and for every checked exception type listed in the throws clause of M, that same exception class or one of its superclasses must occur in the throws clause of T.

Note that because the matching rules require strict matching (identical types for parameter lists and return types), there can be at most one matching method for any given target.

The class or interface determined by the process described herein is searched for a method declaration that matches the delegate type; method definitions inherited from superclasses and superinterfaces are included in this search. Whether a method declaration is accessible to a method invocation depends on the access modifier (public, none, protected, or private) in the method declaration and on where the method designator appears. If the class or interface has no method declaration that is both matching and accessible, then a compile-time error is generated.

Compile-Time Step 3: Is the Chosen Method Appropriate?:

If there is a matching and accessible method declaration for a delegate instantiation expression, it is called the compile-time declaration for the delegate instantiation expression. Several further checks must be made on the compile-time declaration. A compile time error is generated if:

1) If the method designator has a MethodName of the form Identifier, and the method designator appears within a static method, a static initializer, or the initializer for a static variable;
2) If the method designator has a MethodName of the form TypeName.Identifier.

The following compile-time information is then associated with the method invocation for use at run time:
1) A reference to the compile-time declaration. (The method.)
2) The class or interface that contains the compile-time declaration. (The target.)
3) The invocation mode, computed as follows:
   a) If the compile-time declaration has the private modifier, then the invocation mode is nonvirtual.
   b) Otherwise, if the part of the method invocation before the left parenthesis is of the form super. Identifier, then the invocation mode is super.
   c) Otherwise, if the compile-time declaration is in an interface, then the invocation mode is interface.
   d) Otherwise, the invocation mode is virtual.

Runtime Operation

The present invention further provides Java Virtual Machine interpreter software 16 (FIG. 1) to implement the delegates of the present invention. Several steps are required to process a delegate instantiation expression at run-time. First, the compiler must check the accessibility of the target type and method. Second, the compiler must locate the method to invoke, taking into account the possibility of instance method overriding.

Runtime Step #1: Check Accessibility of Type and Method:

Let C be the class containing the delegate instantiation expression, and let T be the class or interface that contained the compile-time declaration for the delegate instantiation expression, and m be the name of the method, as determined at compile time.

The Java Virtual Machine interpreter software 16 insures, as part of linkage, that the method m still exists in the type T. If this is not true, then a IllegalArgumentException (which is a subclass of RuntimeException) is produced. If the invocation mode is interface, then the virtual machine software 16 must also check that the target reference type still implements the specified interface. If the target reference type does not still implement the interface, then an IncompatibleClassChangeError is produced.

The virtual machine software 16 must also insure, during linkage, that the type T and the method m are accessible.

For the type T:
1) If T is in the same package as C, then T is accessible.
2) If T is in a different package than C, and T is public, then T is accessible.

For the method m:
1) If m is public, then m is accessible. (All members of interfaces are public (See §9.2 of the JLS)).
2) If m is protected, then m is accessible if and only if either T is in the same package as C, or C is T or a subclass of T.
3) If m has default (package) access, then m is accessible if and only if T is in the same package as C.
4) If m is private, then m is accessible if and only if C is T.

If either T or m is not accessible, then an IllegalAccessException is produced (See §12.3 of JLS).

Runtime Step #2: Locate Method to Invoke:

The strategy for method lookup depends on the invocation mode. In the present example embodiment, it is not possible to encapsulate a static method with a delegate, and therefore it is clear that an instance method is to be encapsulated by the delegate, and there is a target reference. If the target reference is null, a NullPointerException is thrown at this point. Otherwise, the target reference is said to refer to a target object and will be used as the value of the keyword this when the delegate is invoked. The other four possibilities for the invocation mode are considered next by the Java Virtual Machine interpreter software 16, as follows.

If the invocation mode is nonvirtual, overriding is not allowed. Method m of class T is the one to be invoked. Otherwise, the invocation mode is interface, virtual, or super, and overriding may occur. A dynamic method lookup is used. The dynamic lookup process starts from a class S, determined as follows:

1) If the invocation mode is interface or virtual, then S is initially the actual run-time class R of the target object. If the target object is an array, R is the class Object. (Note that for invocation mode interface, R necessarily implements T; for invocation mode virtual, R is necessarily either T or a subclass of T.)
2) If the invocation mode is super, then S is initially the superclass of the class C that contains the delegate instantiation.

The dynamic method lookup uses the following procedure to search class S, and then the superclasses of class S, as necessary, for method m:

1) If class S contains a declaration for a method named m with the same descriptor (same number of parameters, the same parameter types, and the same return type) required by the method invocation as determined at compile time (described above), then this is the method to be encapsulated by the delegate, and the procedure terminates.
2) Otherwise, if S is not T, this same lookup procedure is performed using the superclass of S; whatever it comes up with is the result of this lookup.

This procedure will find a suitable method when it reaches class T, because otherwise an IllegalAccessException would have been thrown by the checks described above. It is noted that the dynamic lookup process, while described here explicitly, will often be implemented implicitly.

Runtime Step #3: Security Check:

In the example embodiment of delegates set forth herein, there are provided procedures for ensuring that delegates are not used to subvert trusted code. Without special security precautions, untrusted methods can potentially use delegates to have trusted methods invoked in such a way that no untrusted classes appear on the call stack. Under standard Java security, the trusted method would succeed if there were no untrusted methods on the call stack; it would potentially fail if the original untrusted method were on the call stack. A good example is the method java.io.File.delete; if untrusted code were to call this method a SecurityException would be thrown. However, were untrusted code to encapsulate this trusted method in a delegate and pass it to fully trusted code that then invoked the delegate, the method (java.io.File.delegate) would succeed. Hence, the example embodiment set forth herein performs a special security check when instantiating delegates, as discussed below. This security check is performed at runtime.

The example embodiment of the invention herein set forth extends the standard Java security model to associate a set of security permissions with every Java class. For a given class, the associated set of security permissions determines the trusted operations (such as file IO and printing) that methods of the class are allowed to perform. Untrusted classes have an empty permissions set, while fully trusted classes have a full permission set (i.e., they have all permissions).

For a delegate instantiation to succeed at runtime, the permissions of C (the class containing the delegate instantiation expression) must be a superset of the permissions owned by the class containing method m, as determined at runtime. If this is not the case, an IllegalAccessException is thrown. Furthermore, this security check requires that classes derived from a delegate or multidelegate class are final, allowing a look up the call chain to see which entity is creating the delegate. A direct consequence is that untrusted classes may only create delegates onto untrusted methods, while fully trusted classes (i.e., system classes) may create delegates onto any accessible methods.

Compiler vs. Interpreter Activities

As described above, the compiler 14 and interpreter software 16 are separate software components. However, these components may in some cases perform the same functions, such as binding delegates, depending on the mode of operation. Furthermore, the functions of the compiler 14 and interpreter software 16 may in some cases be interchanged or shared with one another. Accordingly, the invention is in no way limited to the particular division of functions set forth in the example embodiment described herein. Rather, the compiler 14 and interpreter software 16 should be thought of as sharing the common task of processing object-based computer code to prepare it for execution by a computer.

The Class com.ms.lang.Delegate

As noted above, all delegates derive from this base Delegate class. An object of type Delegate encapsulates a callable entity: an instance and a method on the instance. An example definition 38 of the class Delegate is shown in FIG. 6.

The protected Delegate(Object target, String methodName) constructor initializes a newly created Delegate object so that it encapsulates the target and method specified by the arguments. If target is null, then a NullPointerException exception is raised. The methodName argument must denote a method that is matching, accessible and appropriate, as defined in above. If no matching target method can be found, an IllegalArgumentException exception is thrown at runtime. If a method is not found, a NoSuchMethodError is thrown.

The result of public final boolean equals(Object obj) is true if and only if the argument is not null and is a Delegate object that has the same target method, and invocation list as this Delegate object. Note that two delegates do not need to be of the same type in order to equal one another, as defined by Delegate.equals. This expression overrides the equals method of Object (See §20.1.3 of JLS).

The expression public static final Delegate combine (Delegate a, Delegate b) combines the two given delegates to form a single delegate. If both a and b are null the result is null. If either a or b is null, the result is the non-null delegate. If neither a nor b is null, the result is a new delegate with an invocation list formed by concatenating the invocation lists of a and b, in that order. It is not considered an error for the invocation list to contain duplicate entries— entries that refer to the same method on the same object. If neither a nor b is null, then the delegates a and b must be of the same actual type. Otherwise, an
IllegalArgumentException exception is thrown by the compiler 14. If neither a nor b is null, then the delegates a and b must be of an actual type that derives from the class MulticastDelegate. Otherwise, a
MulticastNotSupportedException exception is thrown by the compiler 14.

The expression public static final Delegate combine (Delegate[ ] delegates) returns a delegate with an invocation list consisting of the concatenation of the invocation lists of each of the delegates in the delegates array, in order. If the resulting invocation list is empty, the result is null. The delegates array may contain null entries; such entries are ignored. If the delegates array parameter is null or empty, the result is null. The non-null elements of the delegates array must be of the same actual type; otherwise, an IllegalArgumentException exception is thrown. If there are multiple non-null elements in the delegates array, then these elements must be of an actual type that derives from the class MulticastDelegate. Otherwise, a MulticastNotSupportedException exception is thrown by compiler 14.

The expression public static final Delegate remove (Delegate source, Delegate value) returns a delegate with an invocation list formed by removing the last occurrence (if any) of the delegate given by the value parameter from the invocation list of the delegate given by the source parameter. The delegate removed from the invocation list is the last delegate for which the following expression is true: value.equals(delegate) where delegate is the invocation list member in question. If the value parameter is null, or if the delegate given by the value parameter does not appear on the invocation list of the source, the result is the source parameter. If the resulting invocation list is empty, the result is null. If the source parameter is null, the result is null.

The expression public final Object dynamicInvoke (Object[ ] args) can be used to invoke the method in a late-bound manner
(Delegate.dynamicinvoke). When called, the dynamicInvoke member causes execution of the method that the delegate encapsulates, passing the elements of the args argument as arguments to the method. The result of dynamicInvoke is the result of the invocation of the encapsulated method. If the result of the method invocation is an object reference, then this reference is returned. Otherwise, if the result is a primitive value, then the primitive value is wrapped in an Object and returned. (E.g., a boolean value is wrapped in a Boolean object.) Otherwise, the return type of the method is void, and an Object containing the null value is returned.

The public final static Method getMethod( ) method returns a reference to the unique Method object that is the method of the (target, method) pair.

The public final static Object getTarget( ) method returns a reference to the instance part of the (instance, method) tuple that is needed to encapsulate a callable entity.

The public Delegate [ ] getInvocationList ( ) method returns the invocation list of this delegate, in invocation order. For non-multicast delegates, the result is always an array with a single element. For multicast delegates, described below, the resulting array may have more than one element. The invocation list of each of the elements in the returned array is guaranteed to have exactly one entry.

Multicast Delegates

All multicast delegates derive from the class MulticastDelegate, referred to in this example embodiment of Java as Class com.ms.lang.MulticastDelegate. The effect of invoking a multicast delegate may be that multiple methods are invoked. The set of methods invoked by a delegate's invoke method is referred to as the delegate's invocation list, and it can be obtained using the getInvocationList method.

A delegate that inherits directly from Delegate will always have an invocation list with one element—itself. A delegate that inherits from the MulticastDelegate class may have an invocation list with more than one element. The methods Delegate.combine and Delegate.remove methods are used to create new invocation lists.

The invoke and dynamicInvoke methods multicast by invoking each of the delegates in the invocation list with the arguments passed. The delegates are invoked synchronously, in the order in which they appear in the invocation list. If one of the delegates returns an exception, then the multicast ceases, and the exception is propagated to the caller of the invoke method. While a multicast invoke is in progress, calls to Delegate. combine and Delegate. remove may occur. Such calls do not affect the invocation list employed by the multicast that is already in-progress.

In the present example embodiment of the invention the class MulticastDelegate (40) is defined as illustrated in FIG. 7.

The expression protected MulticastDelegate next is an internal reference to the next delegate in the multicast chain. For correct invocation order to be preserved, the "next" delegate must be invoked before invoking the method that this delegate encapsulates.

The protected MulticastDelegate(Object target, String methodName) constructor functions like the corresponding constructor defined in the Delegate base class.

An alternate embodiment of invoking a multicast delegate is to build an array of delegates to invoke by walking the 'next' chain of the multicast delegate. This list may be placed on the program's stack. The virtual machine interpreter software 16 then walks this array in reverse order and calls each delegate's invoke method with the parameters passed to the multicast delegate's invoke method. The advantage of this technique is that the program's stack does not need to be as deep since at maximum only two copies of the parameters passed to the multicast delegate's invoke method are on the stack.

Alternate Example Embodiment: Wrapping Static Members

In one alternate example embodiment of the invention, the J++ language is further extended to wrap static members on a class. For this purpose, there is provided a "class" constructor whose shape is defined by the Delegate base class. The arguments to this constructor, a Class and a String method name, combined with the type of the delegate, uniquely specifies a static member on the indicated class that matches the delegate definition. The newly constructed delegate encapsulates this static method. This constructor takes the form:

protected Delegate(Class class, String methodName)

This constructor initializes a newly created Delegate object so that it encapsulates the static method specified by the arguments. If class is null, then a NullPointerException exception is raised. The methodName argument must denote a method that is matching, accessible and appropriate, as defined above. If no matching target method can be found, an IllegalArgumentException exception is thrown at runtime. If no such method is found, a IllegalArgumentException is thrown.

In the first step at compile time for delegates wrapping static members, the class or interface to search must be determined. If it is a qualified name of the form TypeName.Identifier, then the name of the method is the Identifier and the class to search is the one named by the TypeName. If TypeName is the name of an interface rather than a class, then a compile-time error occurs, because this form can designate only static methods and interfaces have no static methods. It is also necessary to determine, as in the case of wrapping instance members of a class, to determine if the method is appropriate. If there is a matching and accessible method declaration for a delegate instantiation expression, it is called the compile-time declaration for the delegate instantiation expression.

Other checks must also be made on the compile-time declaration. If the method designator has a MethodName of the form Identifier, and the method designator appears within a static method, a static initializer, or the initializer for a static variable, then a compile-time error occurs. In other respects, wrapping static members is an extension or modification to wrapping instance members as described above.

According to this alternate embodiment, a corresponding constructor is also provided for the Multicast Delegate class: protected MulticastDelegate(Class class, String methodName). This constructor functions like the corresponding constructor defined in the Delegate base class.

Alternate Callable Interface

Microsoft® Visual J++ does not support multiple-inheritance. However, sometimes such an interface will be necessary to convert existing code to a delegate type of style. This situation can be analogized to java.lang.Thread vs. java.lang.Runnable. To address this problem, one example embodiment of the invention extends Microsoft® Visual J++ to include a com.ms.lang.Callable interface 42, as shown in FIG. 8. Preferably, delegates implement this interface.

DELEGATE BASED EVENT MODEL

In object-oriented programming, an event is a construct that enables an event source to anonymously notify an event listener (or set of event listeners) that a state transition of some kind has occurred. Events are typically used in a larger system called a "component model" that describes how a component exposes its functionality code that is using the component. At a fundamental level, most modem component models describe how a component exposes its properties (that describe the state of the component), methods (that expose actions that the component is capable of performing) and events (notifications from the component that something interesting has occurred).

An event invocation is like a reverse method call. For a method call, a component consumer calls a method on the component, passing a number of arguments. For an event, the call is in the opposite direction—the component calls a method provided by the component consumer, passing a number of arguments. Besides the difference in direction of the call, there are several other salient differences.

For a method call, the consumer typically has an explicit dependency on the component that is being called. In contrast, event invocations are typically anonymous—the component does not have an explicit dependency on the component consumer. Instead, listeners can connect to an event or set of events using a mechanism provided by the event source.

Also for a method call, the callee determines the shape of the method—the number and types or arguments and the return type. For an event invocation, event source (the caller) determines the shape.

In the example embodiment of the delegate-based component model according to the present invention described below, events are typically used for communication between a component (often written by a commercial vendor) and event handling code (written by a developer using the component). The example embodiment of the component model described below supports both single-cast and multi-cast events.

Class and Interface

There is described below how to expose and exploit events according to this example embodiment of the invention. Several classes are defined and discussed herein:

1) The class Event. Events package interesting state in an event object. All such event objects derive from the Event class. The Event class is also used directly for parameter-less events.

2) The delegate EventHandler, which is used in concert with the class Event.

3) The class CancelEvent, which is used for actions that can be canceled. Before the action occurs, the event source notifies interested listeners that the action is about to occur. Each listener has an opportunity to "cancel" the action.

4) The delegate CancelEventHandler, which is used in concert with the class CancelEvent.

Raising Events

To raise events, an event source does one or more of the following:

1) defines an event class;
2) defines an "event handler" delegate;
3) provides "add" and "remove" methods to enable an event source to connect to an event and subsequently disconnect from it; or
4) provides an "event raising" method that raises an event.

Defining an Event Class

This is a class that derives from the class Event and potentially adds additional contextual information. It is often not necessary to define a new event class because an existing event class can be employed.

Event classes are used by convention. It is possible to define and use events that do not employ event classes at all. The present example component model recommends packaging events as objects to facilitate event wiring scenarios and versioning. These topics are discussed further herein below. For mouse events raised by a window class, the event class shown in FIG. 9 might be defined.

Defining an "event handler" delegate

One such delegate is needed for each interesting set of events. Such a delegate may be used by multiple events. By convention, event handler delegates are defined to match the pattern:

public multicast delegate void <Name>Handler(Object source,<EventType> e);

For the mouse event example 44 of FIG. 9, this implies:

public multicast delegate void MouseEventHandler (Object source,MouseEvent e);

The example embodiment of the event handling model herein set forth provides "add" and "remove" methods that enable an event source to connect to the event, and subsequently disconnect from it. By convention, event handler delegates are defined to match the pattern:

public void addOn<EventName>Handler (<EventHandlerType>handler);
    public void removeOn<EventName>Handler (<EventHandlerType>handler);

For the mouse event example, this implies:

public void addOnMouseMoveHandler (MouseEventHandler handler);
    public void removeOnMouseMoveHandler (MouseEventHandler handler);

Providing an "Event Raising" Method that Raises the Event

This method enables derived classes to raise the event, cancel an event that was raised in a base class, and provide pre- and post-processing without interference from component consumers. The body of the method raises the event calling the Delegate.invoke on the appropriate delegate-valued property, passing the arguments along and adding this as the value of the source parameter for the event. For final classes, there is no need to provide such a method since it is not possible for derived classes to exist. By convention, event handler delegates are defined to match the pattern:

protected void on<EventName>(<EventType> e); For the mouse event example, the method 46 illustrated in FIG. 10 is implied.

Handling Events

Figure 13:
FIG. 13 illustrates example event-handling code according to the present invention.

To listen to events, an event listener does the following:

1) Learns what events are available for a component by using the class ComponentManager, which is described in the JLS.
2) Creates an event handler function with the correct signature, as defined by the delegate used for the corresponding event property, for example as shown in the code 48 of FIG. 11.
3) Connects event handling code to the event by calling the "add" method provided by the event source, for example as shown in the code 50 of FIG. 12.
4) Optionally, disconnects event handling code from the event by calling the "remove" method provided by the source, for example as shown in the code 52 of FIG. 13. In most cases, there is no need to disconnect explicitly.

First Example of the Event Model in J++ Code—the Box Example

FIGS. 14A–14B illustrate example J++ code 54 showing the application of the delegate and event model described above. In FIGS. 14A–14B, a mouse event class and mouse event handler delegate is declared. A box class declaration is also set forth, as well as an illustration of a component consumer which uses two box instances.

Another Example of an Event Model in J++ Code—the Smiley Example

A simple event example wherein an event with no parameters is raised is illustrated in FIGS. 15A–15B. In the J++ program 56 of FIGS. 15A–15B, the Smiley control raises an event when its happy property changes.

Single-Cast and Multi-Cast Events

The event model described above works equally well for single-cast and multi-cast scenarios. By preferred convention in the example embodiment herein set forth, all events are multi-cast. Defining a single-cast event is simple enough to do, though—just omit the multicast modifier in the delegate declaration. Events may appear in either class definitions or in interfaces. It is possible to define a set of events in an interface, and have multiple classes support this interface.

The primary difference between a multicast event model and a single-cast event model is in how the connection is done. With multicast, it is necessary to use a multicast delegate and employ the "addOn" and "removeOn" methods. For single-cast it is possible to use a non-multicast delegate and allow connection/disconnection to an event to be done by property sets and gets. That is, a component provides a delegate-valued property for each of the events that it exposes. For example, for a MouseMove event, a component would expose a "foo" event would expose an "OnFoo" property, as illustrated in the code 58 shown in FIG. 16.

The Class Event

The class Event serves multiple purposes:

1) It acts as the base class for all events. By convention, events for components employ a single parameter whose type is a class that derives from the class Event.
2) It is used for events that have no state. The static member EMPTY is commonly used for this purpose, and allows an event to be raised efficiently, as exemplified in the code 60 illustrated in FIG. 17.

The delegate EventHandler

The delegate EventHandler is used for events that take a single parameter of type Event, as illustrated in the code 62 of FIG. 18.

The class CancelEvent

Figure 19:
FIG. 19 illustrates an example definition of a CancelEvent class according to the present invention.

The CancelEvent class is used for events that refer to an action that can be canceled. The CancelEvent class provides a boolean field named cancel that tells whether the action in question has been canceled. A true value indicates that the action has been canceled; a false value indicates that the action has not been canceled. An initial value for cancel may be provided using the provided constructor. Typically, cancel is initialized to false, so that if the event is not handled, or if the event handler does not alter the cancel field, the event source assumes that permission to perform the action has been given. The CancelEvent class is illustrated in the code 64 of FIG. 19.

The Delegate CancelEventHandler

Figure 20:
FIG. 20 illustrates a declaration of an event handler according to the present invention.

The delegate CancelEventHandler is used for events that take a single parameter of type CancelEvent, as illustrated in the code 66 of FIG. 20.

Other Uses for Delegates

As demonstrated above, delegates are useful in general, particularly for event related scenarios. However, they are also useful for non-event-oriented scenarios, such as a replacement for the callback mechanism in J/Direct and lazy invocation.

Application of the Invention to Other Programming Languages and Systems/Alternate Embodiments The example embodiment of the delegates and event models of the present invention described herein are expressed as an extension Microsoft® Visual J++. However, it shall be understood that the inventions set forth herein are broadly applicable to other object-oriented programming language systems such as C++ and object-based programming languages such as Microsoft® Visual Basic, or other versions of J++ available from Microsoft Corporation or other developers.

Furthermore, the inventions set forth herein are applicable to and take the form of both computer programs written using the inventive code of the present invention and to compilers and run-time virtual machines and other programming systems which translate computer programs into commands executable by a computer system.

The invention further provides that delegates and event models be embodied in physical computer code form in or on a carrier such as but not limited to a hard drive, flexible disk, computer memory or electronic signals that may be used to transport such code from one computer or storage medium to another.

Moreover, although the embodiments disclosed herein are implemented in software, the inventions herein set forth are in no way limited exclusively to implementation in software, and expressly contemplate implementation in firmware and silicon-based or other forms of hard-wired logic, or combinations of hard-wired logic, firmware and software, or any suitable substitutes therefore.

Conclusion

Thus there has been described above method and apparatus for encapsulating a reference to a method in object-oriented or object-based programming systems and ensuring that the reference is safe. As set forth above, the invention provides for:

a) defining an entity that defines the shape of the method to be referenced;

b) obtaining a reference to a method;

c) storing this reference in arbitrary data structures;

d) passing the reference to code written by other parties;

e) enabling invocation of the method by anyone holding the method reference; and f) enabling the holder of a method reference to determine the target object and method being referenced.

Furthermore, the programming system of the present invention accomplishes the above objectives in a strongly typed manner, making it possible for:

a) developers to learn of type mismatch problems early (at compile-time) rather than late (at run-time); and b) development tools to present information to developers about the shape of components that use delegates.

In addition, the invention provides for event based programming, wherein event-related code can be encapsulated in delegates.

What is claimed is:

1. A method for operating a computer using object-based computer code, comprising using a computer to perform the steps of representing an instance and a first method of a class by a delegate value that can be assigned to variables and passed from one procedure to another; and invoking the first method by calling a second method of an instance of a class using the delegate value, wherein the parameters supplied to the second method are supplied to the first method and the parameter list of the second method matches the parameter list of the first method, and further wherein the first method is identified by name and by matching the parameter list and result type of the first method with the parameter list and result type declared for the class.

2. A method according to claim 1 further including the step of using program code to invoke the second method on a variable that has been assigned a value representing an instance of the class.

3. A method according to claim 1 further including the step of handling events using the first method.

4. A method according to claim 1 further including the step of invoking one or more additional first methods with the call to the second method, wherein one or more corresponding additional sets of parameters are supplied to the second method to be supplied to the one more additional first methods, respectively.

5. A method according to claim 4 further including the step of creating an invocation list associated with the second method, wherein the invocation list specifies the first methods to be invoked.

6. A method according to claim 5 further including the step of adding first methods to and deleting first methods from the invocation list.

7. An object-based computer program product comprising computer program code embodied in a computer-readable form on a physical carrier wherein the program code causes a computer to perform the steps of representing an instance and a first method of a class by a delegate value that can be assigned to variables and passed from one procedure to another; and invoking the first method by calling a second method of an instance of a class using the delegate value, wherein the parameters supplied to the second method are supplied to the first method and the parameter list of the second method matches the parameter list of the first method, and further wherein the first method is identified by name and by matching the parameter list and result type of the first method with the parameter list and result type declared for the class.

8. A computer program product according to claim 7 further wherein program code causes the computer to invoke the second method on a variable that has been assigned a value representing an instance of the class.

9. A computer program product according to claim 7 further wherein events are handled using the first method.

10. A computer program product according to claim 7 further wherein the computer invokes one or more additional first methods with the call to the second method, wherein one or more corresponding additional sets of parameters are supplied to the second method to be supplied to the one more additional first methods, respectively.

11. A computer program product according to claim 10 further wherein there is created an invocation list associated with the second method, wherein the invocation list specifies the first methods to be invoked.

12. A computer program product according to claim 11 further wherein first methods are added to and deleted from the invocation list.

13. An object-based programming system comprising a computer adapted to
represent an instance and a first method of a class by a delegate value that can be assigned to variables and passed from one procedure to another; and
invoke the first method with a call to a second method of an instance of a class using the delegate value,
wherein the parameters supplied to the second method are supplied to the first method and the parameter list of the second method matches the parameter list of the first method, and
further wherein the first method is identified by name and by matching the parameter list and result type of the first method with the parameter list and result type declared for the class.

14. A programming system according to claim 13 further wherein program code causes the computer to invoke the second method on a variable that has been assigned a value representing an instance of the class.

15. A programming system according to claim 13 further wherein events are handled using the first method.

16. A programming system according to claim 13 further wherein the computer invokes one or more additional first methods with the call to the second method, wherein one or more corresponding additional sets of parameters are supplied to the second method to be supplied to the one more additional first methods, respectively.

17. A programming system according to claim 16 further wherein there is created an invocation list associated with the second method, wherein the invocation list specifies the first methods to be invoked.

18. A programming system according to claim 17 further wherein first methods are added to and deleted from the invocation list.

19. A programming system according to claim 13 further wherein the computer is adapted with software.

20. A programming system according to claim 13 further wherein the computer is adapted with hardware and software.

21. A programming system according to claim 13 further wherein the programming system includes a compiler.

22. A programming system according to claim 13 further wherein the programming system includes an interpreter.

23. A method for programming a computer in object-based computer code, comprising using a computer to perform the programming steps of:

a) defining a first class having a first method to be used to reference a second method of a second class;

b) representing an instance of the first class and the first method with a delegate value, wherein an instance of the second class and the second method are identified as parameters of the instance of the first class; and c) invoking the second method by calling the first method on the instance of the first class using the value to reference the instance.

24. A method for operating a computer using object-based computer code, comprising using a computer to perform the steps of
representing an instance and a first static method of a class by a delegate value that can be assigned to variables and passed from one procedure to another; and
invoking the first static method by calling a second method of an instance of a class using the delegate value,
wherein the parameters supplied to the second method are supplied to the first method and the parameter list of the second method matches the parameter list of the first method, and
further wherein the first method is identified by name and by matching the parameter list and result type of the first method with the parameter list and result type declared for the class.

25. An object-based computer program operative to cause a computer to:

1) receive the following program statements in computer readable:

a) a program statement declaring a first class to be used to invoke a method of an instance of another class, wherein the first class is declared with a parameter list and result type, and wherein the first class includes a method to be used to invoke the method of the other class;

b) a program statement instantiating an instance of the first class with the method name and the name of the instance of the other class supplied as parameters, wherein the instance and method of the first class are represented as a delegate value that can be assigned to variables and passed from one procedure to another;

c) a program statement calling the method of the instance of the first class using the delegate value and including parameters to be provided to the method of the other class; and 2) search other program statements supplied to the computer for the method of the other class and identifying it by comparing its parameter list and result type with the parameter list and result type of the first class.

26. An object-based program according to claim 25 wherein the compiler is operative on the computer to check if the method of the other class identified by the search meets one or more acceptance criteria.

27. An object-based computer program product including the following program statements encoded in computer-readable form on a physical carrier:

a) a program statement declaring a first class to be used to invoke a method of an instance of an another class, wherein the first class is declared with a parameter list and result type, and wherein the first class includes a method to be used to invoke the method of the other class;

b) a program statement instantiating an instance of the first class with the method name and instance of the other class supplied as parameters, wherein the instance and method of the first class are represented as a delegate value that can be assigned to variables and passed from one procedure to another; and c) a program statement calling the method of the instance of the first class using the delegate value and including parameters to be provided to the method of the instance of the other class.

28. A product according to claim 27 wherein the instance of the first class is instantiated in a class having a set of security permissions, and the other class has a set of security permissions, and wherein the security permissions are encoded in computer-readable form on the carrier.

29. A computer-implemented method of calling a target method in an object-based computer program comprising calling a first method on an instance of a first class wherein the parameters supplied to the first method include a delegate reference to the target method and instance on a second class, and wherein the first method calls the target method using the delegate reference, and wherein the delegate reference can be assigned to variables and passed from one procedure to another, and further wherein the instance of the first class is instantiated in a third class having a set of security permissions, the second class has a set of security permissions, and the set of security permissions of the third class are compared to the set of security permissions for the second class in order to determine if the third class can instantiate the instance of the first class.

30. A method according to claim 29 further including the step of preventing the first class from being instantiated if the call of the target method is not permitted.

31. A data structure recorded on a computer-readable medium comprising a plurality of class definitions in an object-based computer language and a plurality of security permissions each associated with at least some of the classes, wherein the security permissions associated with the classes are structured so that they may be compared with one another to determine if an instance of a class used to call to a method of an instance of another class may be instantiated in yet another class using a delegate value, wherein the delegate value represents a method and instance of the another class that can be assigned to variables and passed from one procedure to another.

32. A computer program product comprising a computer program encoded in computer-readable form on a physical carrier, comprising:

one or more computer program modules for reading and processing an object-based computer program to prepare it for execution; and wherein one or more of the modules checks security permissions associated with one or more classes to determine if an instance of a class used to call to a method of an instance of another class may be instatiated in yet another class using a delegate value, wherein the delegate value represents a method and instance of the another class that can be assigned to variables and passed from one procedure to another.

33. A method of operating a computer, comprising:

reading and processing an object-based computer program to prepare it for execution; and checking security permissions associated with one or more classes to determine if an instance of a class used to call to a method of an instance of another class may be instantiated in yet another class using a delegate value, wherein the delegate value represents a method and instance of the another class that can be assigned to variables and passed from one procedure to another.

34. A method according to claim 33 further including the step of checking that the instance of the class is a final class to facilitate a security check.

35. A computer program product comprising a computer program encoded in computer-readable form on a physical carrier, comprising:

one or more computer program modules operative on a computer for reading and processing an object-based computer program to prepare it for execution; and wherein one or more of the modules:

1) receives the following object-based program statements in computer readable form:

a) a program statement declaring a first class to be used to invoke a method of an instance of another class, wherein the first class is declared with a parameter list and result type, and wherein the first class includes a method to be used to invoke the method of the other class;

b) a program statement instantiating an instance of the first class with the method name and the name of the instance of the other class supplied as parameters, wherein the instance and method of the first class is represented as a delegate value that can be assigned to variables and passed from one procedure to another;

c) a program statement calling the method of the instance of the first class using the delegate value and including parameters to be provided to the method of the other class; and 2) searches other program statements supplied to the computer for the method of the other class and identifying it by comparing its parameter list and result type with the parameter list and result type of the first class.

36. A computer program product comprising a computer program encoded in computer-readable form on a physical carrier, comprising:

one or more computer program modules operative on a computer for reading and processing an object-based computer program to prepare it for execution; and wherein one or more of the modules receives in computer readable form a program statement, in an object-based computer language, declaring a class to be used to invoke a method of an instance of another class, wherein the instance and method of the other class are represented by a delegate value that can be assigned to variables and passed from one procedure to another, and wherein the first class is declared with a parameter list and result type, and automatically creates a method on the first class to be used to invoke the method of the instance of the other class using the delegate value.

37. An object-based program according to claim 36 wherein a module comprises functionally related computer program code and data.

38. A method comprising a computer receiving a computer readable program statement, in an object-based computer language, declaring a class to be used to invoke a method of an instance of another class, wherein the class is declared with a parameter list and result type, and representing the method and instance of the another class by a delegate value that can be assigned to variables and passed from one procedure to another; and in response to the declaration of the class automatically creating a method on the first class to be used to invoke the method of the instance of the other class, using the delegate value.

* * * * *